March 1, 1960     C. E. REDEMANN ET AL     2,926,752
SEPARATION OF CARBON DIOXIDE FROM GASEOUS MIXTURES
Filed Sept. 22, 1958
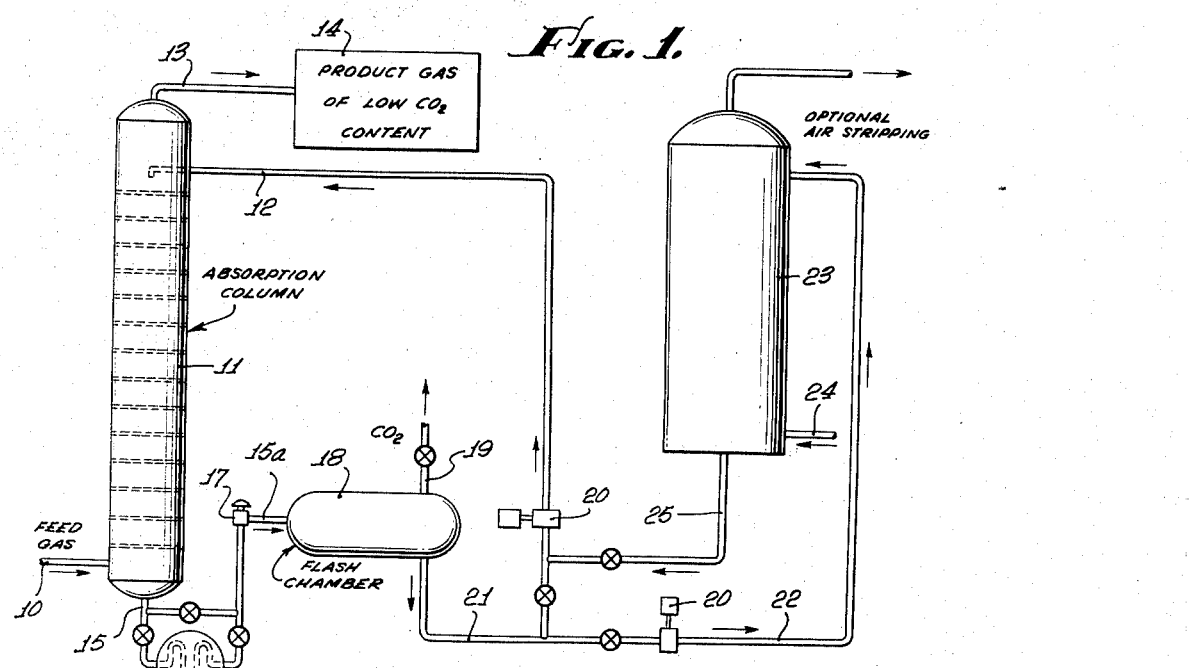
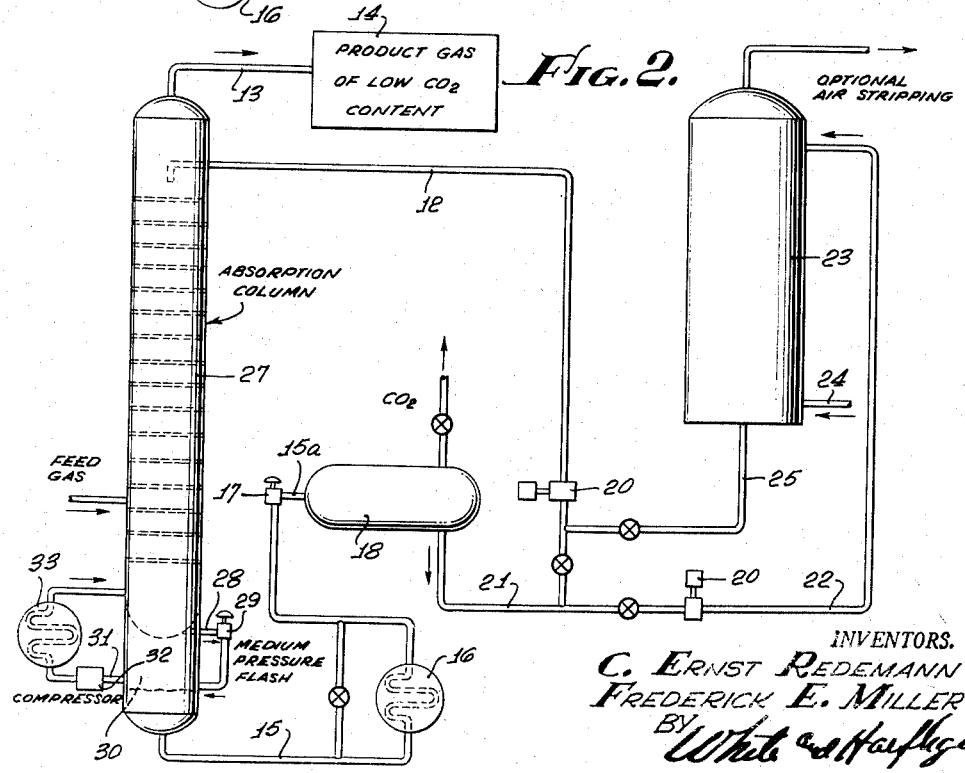
INVENTORS.
C. ERNST REDEMANN
FREDERICK E. MILLER
BY
ATTORNEYS.

United States Patent Office 2,926,752
Patented Mar. 1, 1960

2,926,752

SEPARATION OF CARBON DIOXIDE FROM GASEOUS MIXTURES

Clio Ernst Redemann, Monterey Park, and Frederick E. Miller, Whittier, Calif., assignors to The Fluor Corporation, Ltd., Los Angeles, Calif., a corporation of California Application September 22, 1958, Serial No. 762,633

12 Claims. (Cl. 183—115)

This invention has to do with improved processes for the recovery of carbon dioxide from gaseous mixtures containing also such components as hydrocarbons, typically methane and natural gas; also one or more of such gases as air, nitrogen, oxygen and hydrogen. In some instances moisture may be present as may also some hydrogen sulfide. Specifically the invention relates to a novel process for the selective absorption of carbon dioxide from such mixtures, in a continuously recirculated absorbent in which carbon dioxide has under the operating conditions of the process, high solubility in the absorbent without chemical reaction therewith, so that the invention lends itself to the most economically efficient stripping of the absorbent for re-use.

It has been found that glycerol triacetate, hereinafter termed triacetin, has to unique advantage, properties of high solvent capacity, non-corrosiveness, stability and low volatility, rendering it particularly advantageous for use in selective absorption and the separation or recovery of carbon dioxide from gaseous mixtures thereof. Having a boiling point of about 495° F. to 500° F., the triacetin serves efficiently and economically as a solvent for absorption operations at temperatures upwards of about 130° F., and having in addition to an unusually high carbon dioxide absorption capacity, the triacetin has strong chemical stability, acceptable viscosity and desirable selectivity.

The following table compares the carbon dioxide absorption capacity with two common scrubbing substances, diesel oil and water.

TABLE I

|  | S.c.f. Gas/c.f. Sol. @ A.t.m., 80° F. | | |
| --- | --- | --- | --- |
|  | $CO_2$ | $CH_4$ | $H_2$ |
| Water | 0.8 | 0.03 | 0.02 |
| Diesel Oil | 0.6 | 0.47 | 0.040 |
| Triacetin | 3.7 | 0.18 | 0.037 |

As indicated by the table, only about 1/5 as much triacetin as water (or 1/6 as much triacetin as diesel oil) is required to absorb the same amount of carbon dioxide. Therefore, although the solubility of hydrogen in triacetin is somewhat higher than in water and about the same as in diesel oil, the net hydrogen loss with triacetin is only about 1/3 of that for water scrubbing and 1/6 of that found with diesel oil scrubbing for carbon dioxide removal. In scrubbing carbon dioxide from methane, the methane losses would be similar for triacetin and water and vastly higher for diesel oil. Air, nitrogen and carbon monoxide behave in a similar fashion to hydrogen, and triacetin may also be used in these cases as well.

The potential for triacetin in scrubbing carbon dioxide from synthesis gas is great. A major factor in the present cost of hydrogen manufacture by gas synthesis is the cost of purifying the gas of the large quantities of carbon dioxide associated with its manufacture. The weight of carbon dioxide in a typical raw synthesis gas is roughly ten times the weight of hydrogen. A typical chemical absorption regeneration proces for carbon dioxide removal, such as aqueous amine, requires over two pounds of steam to absorb and regenerate a pound of carbon dioxide. Thus, 40,000 pounds of steam are required per ton of hydrogen produced, a processing cost of 20 to 40 dollars per ton in most cases. The present process requires no steam regeneration and can thus be considered a major step forward in tonnage hydrogen production. A 40,000 b.p.d. oil from coke refinery would require in the neighborhood of 750 tons per day of scrubbed hydrogen and the saving of this steam alone could represent 15–30 thousand dollars per day. In addition to steam savings, reduced construction costs and maintenance also result from the basic simplicity of the operation.

Properties of triacetin usable for design of an absorption process appear in the table below.

TABLE II

|  | Triacetin |
| --- | --- |
| Freezing point | −108° F. |
| Specific gravity | 1.155. |
| Lb./gallon solution | 9.6. |
| pH (solvent in water soln.) | 7.0 |
| Specific heat (b.t.u./lb./°F.) | 0.50. |
| Viscosity, at 80° F | 12.6 centistokes. |
| Vapor pressure at 80° F | 0.001 mm. Hg. |
| Saturated water content 80° F | 5.3 wt. percent. |
| Relative humidity of gas over 1% water solution | 42%. |
| Carbon dioxide solubility @ 80° F. 1 atm. pr | 3.70 s.c.f./cu. ft. solution. |
| Methane solubility @ 80° F. 1 atm. pr. | 0.18 s.c.f./cu. ft. solution. |
| Hydrogen solubility @ 80° F. 1 atm. pr. * | 0.037 s.c.f./cu. ft. solution. |
| Heat of solution b.t.u./lb. mol | 195. |

\* Nitrogen, oxygen, and carbon monoxide solubility are of the same magnitude as hydrogen solubility.

The advantages of scrubbing carbon dioxide with triacetin as compared with water scrubbing will be apparent from the osbervations that the carbon dioxide dissolving capacity of triacetin is almost five times that of water, and the process does not result in water addition to the gas being treated, a feature of importance in the case of natural gas where the problems of hydrate formation exist and all pipe line gas must be dried; triacetin containing less than 2% water is essentially non-corrosive to steel equipment in the presence of air and carbon dioxide, and equipment costs are low by reason of the high solvent capacity of triacetin with carbon dioxide.

Advantages in the use of triacetin as compared with amine and alkali carbonate solutions arise from the fact that steam regeneration of the solvent is not required and the cost of air regeneration, where used, is comparatively small. Amine and alkali carbonate solutions require about 80 to 250 lbs. of steam per M c.f. carbon dioxide regenerated and add water to the gas being treated. Corrosion is negligible using triacetin, heat interchange between solvent streams is not usually required; and the simplicity of the process reduces equipment costs to a minimum.

The outstanding feature of the present physical solvent over chemical solvents is the high solution capacities possible with superatmospheric carbon dioxide partial pressures. The present process is best suited for operation in the absorption stage between 40 and 600 p.s.i. carbon dioxide partial pressures and at temperatures between 30 and 130° F., and has the following equilibrium solution carrying capacities for carbon dioxide at 80° F., and 40° F.

|  | Carbon Dioxide Pressure, p.s.i.g. | | | |
| --- | --- | --- | --- | --- |
|  | 60 | 200 | 400 | 600 |
| S.c.f. $CO_2$/c.f. Sol. @ 80° F | 19.6 | 57.5 | 133 | 289. |
| S.c.f. $CO_2$/c.f. Sol. @ 40° F | 32.0 | 112 | 416 | Infinite solubility. |

In water the solubility of $CO_2$ is roughly proportional to pressure and its use is progressively less attractive than triacetin with rising pressure.

The invention comprises passing a pressurized carbon dioxide containing gas countercurrent and in intimate contact with a solvent consisting principally of triacetin in a first zone, withdrawing the solvent from the first zone and subjecting said solvent to a flash degassing in one or more consecutive flash chambers operating at lower pressures, and returning the thus regenerated liquid to the first zone for further contacting. Where the desired carbon dioxide partial pressure in the outlet gas is lower than can be attained in the final flash stage, an additional zone following this stage may be used to countercurrently strip the solvent with inert gas or air. Heat exchangers are not necessary in this process but may be used to provide lower operating temperatures and the consequent increases in capacity.

The invention will be more fully understood from the following detailed description of the accompanying drawing, in which:

Fig. 1 is a view showing in flow sheet form one illustrative embodiment of the invention; and Fig. 2 is a view similar to Fig. 1 illustrative of a variation of the process.

Referring first to Fig. 1, a high pressure gaseous mixture containing carbon dioxide (e.g. 10 to 50%) which may be at least partially saturated with water vapor and contain any of such other impurities as we have mentioned hereinabove, typically hydrogen sulfide, are introduced at approximately atmospheric temperature through line 10 into the bottom of the absorption column 11, which may be any suitable device such as multiple trays or packed tower which assures multistage and countercurrent contact of the gaseous and liquid phases. Preferably, the absorption zone is maintained to give a carbon dioxide inlet partial pressure between about 60 and 600 p.s.i.a. and a solution exit temperature between about 70° F. and 120° F. High pressure in the absorption zone has the effect of increasing both the amount and rate of carbon dioxide absorption. Solubility of carbon dioxide is also increased by lowering the solvent temperature, but temperatures substantially below 60° F. require costly refrigeration and slow down the rate of absorption.

Triacetin solvent is introduced to the top of the absorption column 11 through line 12 to flow downwardly and in intimate countercurrent contact with the rising gas stream, the scrubbed residue of which is released through line 13 for passage to storage 14 or other suitable disposition. With sufficient contacting stages in the column, the scrubbed gas will approach temperature and carbon dioxide pressure equilibrium with the in-coming liquid.

Liquid solvent containing dissolved carbon dioxide is released from the absorber through line 15 at a temperature higher than the feed stream in line 12, by the heat of absorption of the dissolved carbon dioxide and the sensible heat difference between the inlet and outlet gas streams. An optional heat exchanger 16 may be used to maintain at a desired level the temperature of the rich solution leaving the column. The exchanger usually is a cooler because cooling of the solution increases the absorptiveness of carbon dioxide. The location of this cooling may be anywhere in the flow path of the solvent and is shown near the absorber only because here the solution is warmest. The solution then undergoes a controlled pressure reduction and resultant flashing through line 17 into a flash chamber 18 which typically may be maintained at about atmospheric pressure. To aid in equilibration, the line 15a between valve 17 and the flash chamber may be several diameters long and so designed as to provide turbulent cocurrent contact between the solvent and flashing carbon dioxide gas. In this flash the solvent not only loses heat acquired in the absorber 11, but also undergoes additional refrigeration due to expansion of carbon dioxide to a lower partial pressure. Valve 17 may be replaced in part or entirely by a power recovery device such as a turbine (not shown), and the power thus recovered can be used in the process to offset pumping costs or provide refrigeration. From the flash chamber 18, the released carbon dioxide is vented to the atmosphere through line 19. This vent gas generally contains most of the hydrogen sulfide and water vapor present in the inlet gas. The degassed solution is now in equilibrium with the carbon dioxide evolved at the flash pressure and may be returned by pump 20 through lines 21 and 12 for re-use in the absorber.

Where a lower carbon dioxide level is desired in the scrubbed high pressure gas leaving the absorber through line 13 than can be obtained by the simple flashing operation described, any suitable other means such as vacuum or air stripping may be employed to further deplete the solvent of dissolved gas. Typically some or all of the solution may be taken from line 21 through line 22 and passed downwardly through a stripper column 23 into the base of which is introduced air or other inert gas through line 24. The stripped solvent then returns through line 25 to be recirculated through line 12 to the absorber. Generally an air ratio in the air stripper 23 of from one to four s.c.f. per gallon of solution is satisfactory for nearly complete removal of the dissolved gas in three theoretical stripping stages.

Fig. 2 illustrates a variation of the process designed especially for the removal of carbon dioxide from natural gas or other mixtures where hydrocarbon solubility may be a problem. Here the rich solution leaving the bottom of the absorption column 27 through line 28 is reduced in pressure at the valve 29 and released into the intermediate pressure flash chamber 30. The pressure of this flash may be varied to suit design considerations, but generally lies between the operating pressure of the absorber and the vapor pressure of the dissolved carbon dioxide in the solvent. Typically the pressure range in the chamber 30 may be between about ½ to ⅕ that in the absorber. The relative volatility of methane, for example, can be anywhere from 10 to 30 times that of carbon dioxide, and the gas stream leaving the chamber through line 31 will be concentrated in the dissolved methane. This stream represents only a small portion of the total gas absorbed and may be used for fuel or re-cycled to the absorber for recovery by way of compressor 32 and cooler 33. The solution withdrawn from chamber 30 through line 15 may be subjected to carbon dioxide flash-off and stripping in the same manner described with reference to Fig. 1. Accordingly, corresponding parts in the system are given the same reference numerals.

For best operation the glycerol triacetate solvent should contain approximately 1 percent water or less. Due to the low hygroscopicity of the solvent this is not a difficult condition to provide for and the solvent may actually be used to treat the gas stream for combined removal of carbon dioxide and water. A water material balance can be made on any processing scheme selected and absorption and flash temperatures adjusted to maintain a given condition. Measurements made at temperatures as high as 160° F. indicate hydrolysis in solutions containing less than 2 percent water is negligible. Similar results were obtained in studies on the rates of oxidation under air stripping.

The following examples are illustrative of typical conditions for practicing the present invention.

*Example I*

A mixture of 45 percent carbon dioxide in hydrogen saturated with water at 80° F. and 350 p.s.i.g. was introduced into the bottom of a packed 1 inch absorption column (corresponding to column 11) the packing consisting of twelve feet of ¼ inch Raschig rings. Triacetin previously air-stripped was pumped to the top of the absorber at a temperature of approximately 70° F. at the rate of 87 gallons/M s.c.f. entering gas. The liquid solution contacting the rising gas stream countercurrently scrubbed the carbon dioxide from the gas, effectively leaving a residual of only 0.3 percent in the product hydrogen. In absorbing carbon dioxide, the triacetin solution heated at 85° F., absorbing 5.2 s.c.f. of carbon dioxide per gallon of solution. The rich solution was then reduced in pressure in an atmospheric flash where 90 percent of the carbon dioxide absorbed was released and the solution returned to the 70° F. liquid inlet temperature. The atmospheric flash gas consisted of 97.8 percent carbon dioxide and 2.2 percent dissolved hydrogen. Further solution treatment consisted of air stripping at 70° F. in a 27 tray column using 2.0 s.c.f. air per gallon solution which effectively reduced the carbon dioxide content of the liquid to an insignificant amount. The solution was then pumped to the 350 p.s.i.g. absorber for further use.

The approach to equilibrium in this case was approximately 90 percent and represented a carrying capacity 50 percent higher than typical amine solutions with a minimum of operating costs and equipment. The solution maintained itself at an equilibrium water content of 0.3 weight percent, at the same time the water content of the treated gas was lowered from saturated at 80° F. to 20 percent relative humidity at the 70° F. exit temperature.

*Example II*

A natural gas mixture consisting of 50 percent carbon dioxide in methane, saturated with water at 80° F. and at a pressure of 800 p.s.i.g. was fed into the bottom of a packed 1 inch diameter absorption column packing consisting of eight feet of ¼ inch Raschig rings. Triacetin from an atmospheric flash was pumped into the top of the absorber at a temperature of 45° F. and a rate of 41 gallons/M c.f. entering gas. The liquid solution, contacting the rising gas stream countercurrently, scrubbed the carbon dioxide in the natural gas to a level of 5.0 percent which is sufficient for many natural gas pipeline specifications. The saturated solution leaving the column increased in temperature to 90° F. as a result of absorbing 12.5 s.c.f. carbon dioxide per gallon and 2.0 s.c.f. methane per gallon. The rich solution was then reduced in pressure to one atmosphere and a carbon dioxide stream containing 15 percent methane vented. The vented solution, now 43° F. was warmed to the 45° F. level and pumped to the absorber with 1.0 s.c.f. carbon dioxide per gallon remaining in solution. The scrubbed sendout gas was dehydrated to 1.2 lb. water per MM s.c.f., well below the level required by natural gas pipelines.

*Example III*

In this example, the gas treatment of the previous example includes the intermediate pressure recycle flash shown in Figure 2. A natural gas mixture consisting of 50 percent carbon dioxide in methane saturated with water at 80° F. and 800 p.s.i.g. was fed into a 1 inch packed absorption column at an intermediate point with 7½ ft. of ¼ inch Raschig rings above the feed entry and 2 ft. of ¼ inch Raschig rings below the feed entry. Glycerol triacetate from the atmospheric flash was pumped at the top of the absorber at a temperature of 44° F. and a rate of 45.6 gallons/M c.f. of entering gas. At the base of the column a recycle gas stream of 69.6 percent carbon dioxide natural gas entered. The liquid solution, contacting the rising gas streams countercurrently scrubbed the carbon dioxide in the natural gas to a level of 5.0 percent as before. The saturated solution leaving the column increased in temperature to 90° F. as a result of absorbing 13.5 s.c.f. carbon dioxide per gallon and 1.5 s.c.f. methane per gallon. The rich solution was then reduced from 800 p.s.i.g. to 300 p.s.i.g. with the consequent flashing of approximately 4.7 s.c.f./gallon of the dissolved gases. This intermediate pressure stream, a 69.6 percent carbon dioxide natural gas, was recycled via a single stage compression to the absorber base at a temperature of 90° F. for retreating, and the liquid flashed to one atmosphere in a second flash chamber. Approximately 9.5 s.c.f./gallon of 97 percent carbon dioxide was released in this step, a 300 percent increase in capacity over typical amine solutions and a 70 percent saving in the methane lost in Example II. The scrubbed sendout gas was also found to be low in water with only 1.5 lb. water/MM s.c.f. gas remaining in the scrubbed gas.

We claim:

1. The process of recovering carbon dioxide from feed gas mixtures containing carbon dioxide and a compound of the group consisting of hydrogen, carbon monoxide, hydrocarbons, nitrogen, oxygen, moisture and air, that includes passing the feed gas through an absorption zone at superatmospheric pressure in countercurrent contact with glycerol triacetate and thereby preferentially absorbing carbon dioxide in the triacetate, removing unabsorbed components of the feed gas from said zone, separately removing therefrom a stream of the rich triacetate and reducing the pressure thereof to flash off carbon dioxide, and thereafter recycling the triacetate to said absorption zone for counter-flow contact with said feed gas.

2. The process of claim 1, in which removal of carbon dioxide from the rich glycerol triacetate solution occurs without the addition of heat thereto.

3. The process of claim 1, in which the carbon dioxide partial pressure in the gas fed to the absorption zone is between about 60 and 600 p.s.i.a.

4. The process of claim 3, in which the temperature of the solution leaving the absorption zone is between about 70° F. and 120° F.

5. The process of claim 3, in which the rich triacetate solution contains moisture absorbed from the feed gas and absorbed moisture is flashed-off with carbon dioxide from the rich solution by virtue of the pressure reduction, thus drying the gas.

6. The process of claim 1, in which the glycerol triacetate solution removed from the absorption zone is cooled before return thereto by means other than said pressure reduction.

7. The process of claim 1, in which residual carbon dioxide is removed from the glycerol triacetate stream following said pressure reduction and the resulting carbon dioxide removal.

8. The process of claim 7, in which said residual carbon dioxide removal is effected by air stripping of the glycerol triacetate stream.

9. The process of claim 1, in which the rich triacetate removed is subjected to one or more intermediate pressure flashes and the gas thus evolved is recirculated to the absorber, substantially reducing vent gas losses.

10. The process of claim 1, in which another undesirable impurity of the group consisting of hydrogen sulfide, carbonyl sulfide, and mercaptans is removed from the treated gas along with the carbon dioxide.

11. The process of claim 1, in which pressure reduction of the rich triacetate removed from the absorption zone occurs in successive stages from the first of which the flashed-off gas is compressed and returned to said zone.

12. The process of claim 1, in which the triacetate is passed from said zone downwardly through a second zone from which said rich triacetate is removed and then subjected to successive stage pressure reduction from the first of which the flashed-off gas is compressed and returned to the bottom of said second zone.

References Cited in the file of this patent

UNITED STATES PATENTS

| | | |
|---|---|---|
| 2,540,905 | Neubauer et al. | Feb. 6, 1951 |
| 2,630,405 | Frazier | May 12, 1953 |
| 2,649,166 | Porter et al. | Aug. 18, 1953 |
| 2,781,862 | Fussman | Feb. 19, 1957 |

OTHER REFERENCES

"Solubilities of Inorganic and Organic Compounds," Seidell, volume 1, 2nd edition, Van Nostrand Inc., New York, N.Y., 1919, pages 233, 234.